Oct. 29, 1935. H. E. BALSIGER 2,019,040
THERMOSTATIC CONTROL FOR GRINDING MACHINES
Filed Feb. 15, 1934 2 Sheets-Sheet 1
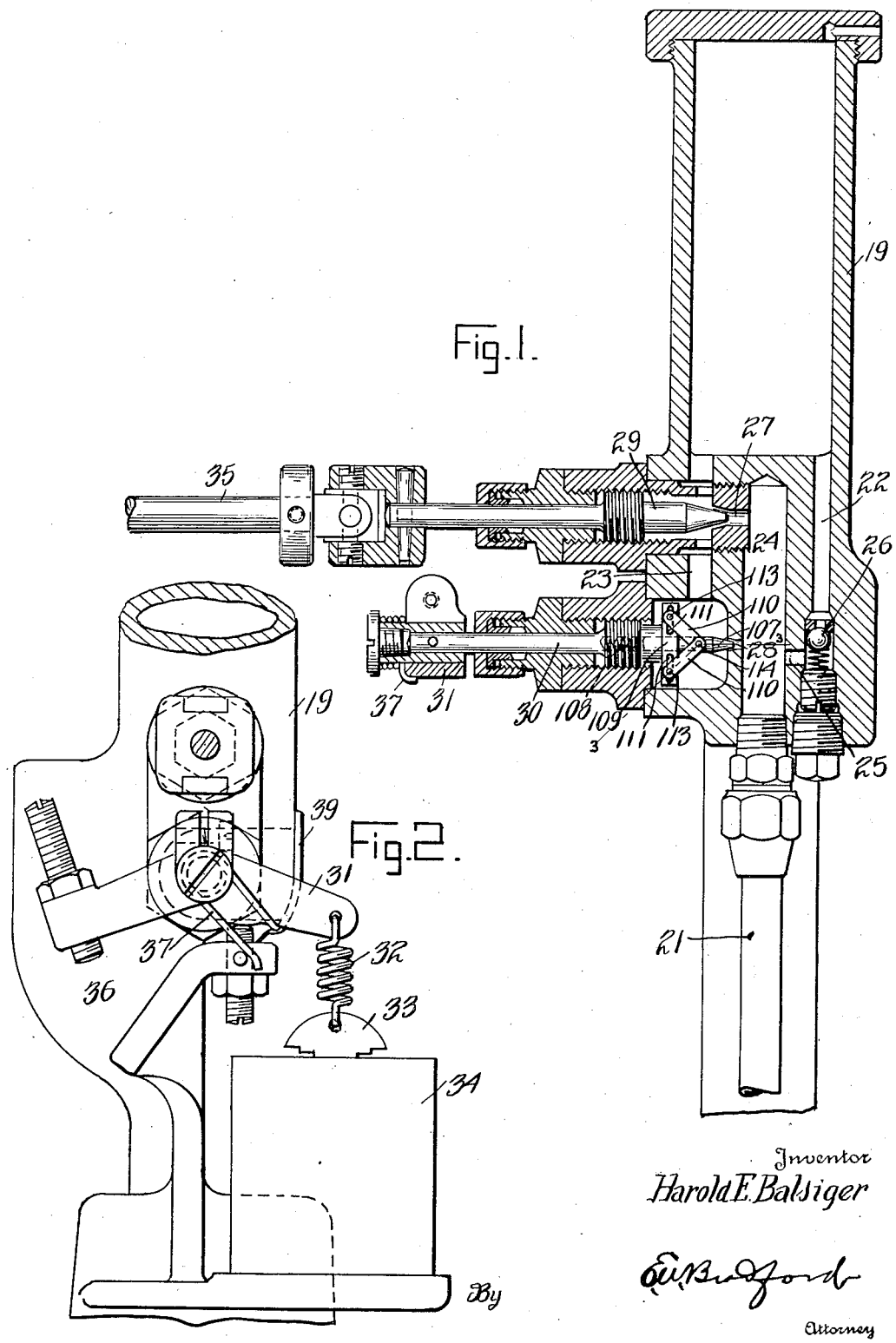
Inventor
Harold E. Balsiger
By
[signature]
Attorney Oct. 29, 1935. H. E. BALSIGER 2,019,040
THERMOSTATIC CONTROL FOR GRINDING MACHINES
Filed Feb. 15, 1934 2 Sheets-Sheet 2
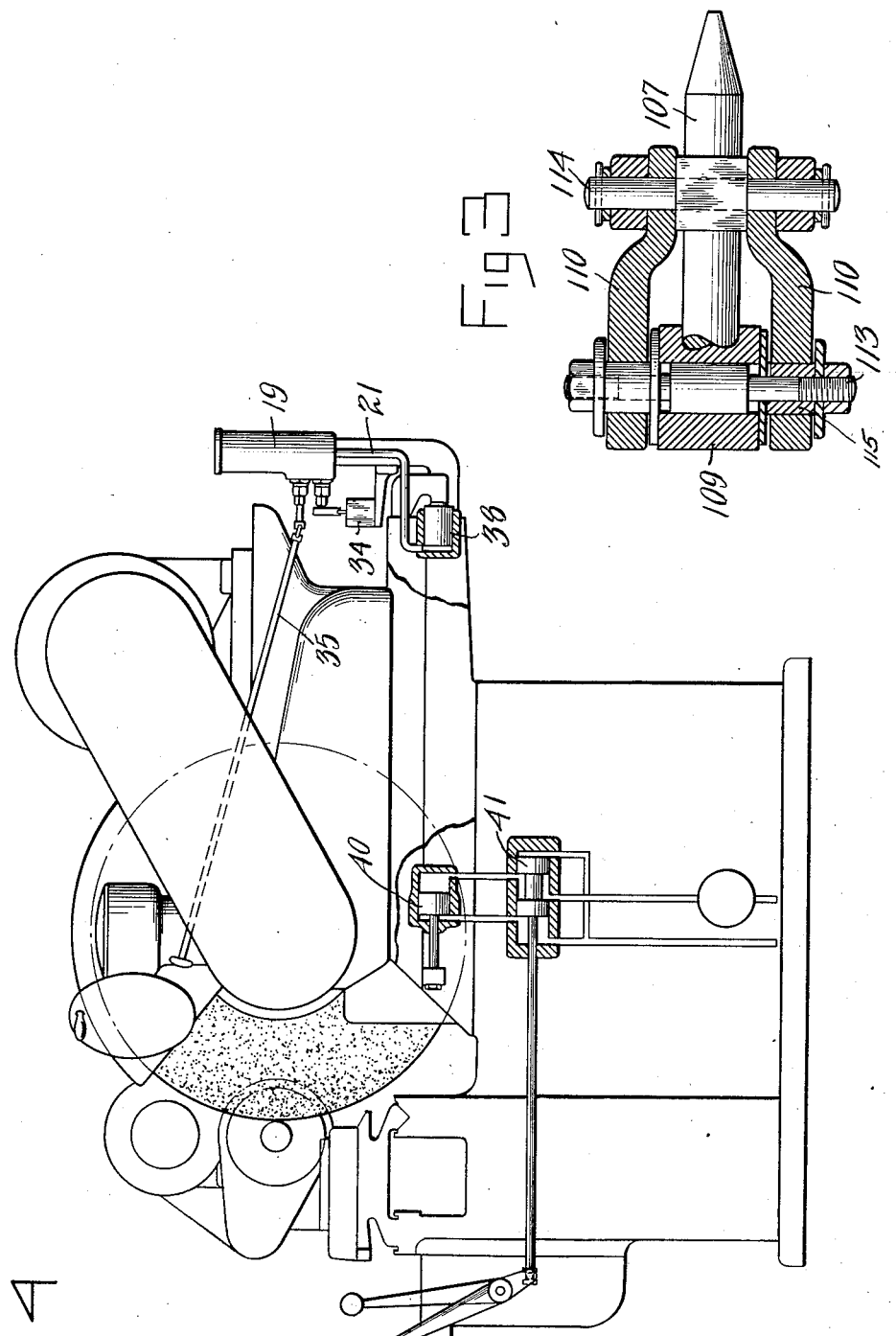
INVENTOR
Harold E. Balsiger.
BY
ATTORNEY Patented Oct. 29, 1935

2,019,040

UNITED STATES PATENT OFFICE 2,019,040

THERMOSTATIC CONTROL FOR GRINDING MACHINES

Harold E. Balsiger, Waynesboro, Pa., assignor to Landis Tool Company, Waynesboro, Pa., a corporation of Pennsylvania Application February 15, 1934, Serial No. 711,433

6 Claims. (Cl. 51—95)

This invention relates to carriage control mechanism and particularly for means for controlling the feed of a grinding wheel carriage toward the work.

An object of the invention is to provide means for maintaining a uniform feed of the carriage through any ranges of temperature variations and particularly to provide means responsive to temperature changes in the fluid in the feed control system for controlling the feed. The control is particularly adapted for use on a grinding machine such as that shown in my copending application Serial No. 623,225, filed July 18, 1932 for Feed controls.

Referring to the accompanying drawings, which are made a part hereof and on which similar reference characters indicate similar parts, Figure 1 is a vertical section through the feed control reservoir showing the feed control valves, Figure 2 is a view in elevation of the said reservoir and valves showing a solenoid for operating one of the valves.

Figure 3 is a sectional plan view on line 3—3 of Figure 1.

Figure 4 is a diagrammatic end elevation of a grinding machine showing the wheel feed mechanism with which my device is used.

In the drawings numeral 19 indicates a fluid reservoir from which a fluid such as oil may flow freely through a port 22, a valve 26, a port 25, a chamber 24 and a pipe 21 to a feed control cylinder 38. A wheel feed cylinder 40 is controlled by valve 41. The ball valve 26 is positioned to permit fluid to flow freely from the reservoir but prevents its return to the reservoir. Valve ports 27 and 28 provide for return of fluid from the wheel feed cylinder through chamber 23 into reservoir 19. The port 27 is controlled by a needle valve 29 which is manually operable through a valve stem 35. The port 28 is controlled by a needle valve having a valve stem 30 to which is attached an operating arm 31. The arm 31 is connected by a spring link 32 with the armature 33 of a solenoid 34 so that the valve stem 30 may be electrically operated and, as shown in the copending application referred to, may be operated at a predetermined point to partially close off the port 28 to slow down movement of the wheel carriage or other carriage upon which the control device is mounted. A spring 37 operates in opposition to the movement of the solenoid to restore the valve to a predetermined open position. The valves, solenoid and associated elements may be mounted on a suitable support 36.

The present invention provides means for adjusting the opening at valve port 28 in response to variations in temperature of the fluid within the control system. This heat responsive device consists of a valve 107 adapted to vary the opening of port 28. This valve is slidably mounted within a bore in the end of the valve stem 30. A bar 109 is secured to the end of the valve stem 30. This bar is provided with slots 111 in each end. Bars 110 are pivotally secured to the bar 109 by pins 113 which pass through the slots 111. Bushings 115 which are slightly longer than the width of the bar 110 permit said bars to be secured to bar 109 without effecting the pivotal action. The bars 110 are also pivotally attached by means of pin 114 to the valve 107. A spring 108 is mounted within the bore in stem 30 adapted to urge the valve 107 outward of this bore against the bars 110. The bars 110 and the bar 109 are made of material having different co-efficients of expansion so that for a given change of temperature in the bars there will be a greater expansion or contraction in the bars 110 than in bar 109. This difference will be reflected in valve 107 by lengthwise movement.

The purpose of this is that a rise in temperature of the oil in the feed control system will cause a corresponding change of temperature in the bars 109 and 110 which will in turn move the valve 107 to change the opening of port 28.

As the oil or other fluid in the control system gradually becomes warmer its resistance of flow through the valve opening of port 28 becomes less and less and in order that there will be a uniform flow of oil through this port during the feeding time of the machine the opening will have to be closed gradually at such a rate as to compensate for the decreasing resistance of the flow of the oil.

It can be seen that the bars 110 and 109 acting on the valve 107 move the valve to accomplish this end.

The means to adjust the bars 110 in slots 111 on bar 109 makes possible by changing the angular relation between the two bars 110 to increase or decrease the rate of lengthwise movement of the valve 107 as the temperature changes. The greater the angle the greater the movement of valve 107 per each degree of temperature change and vice versa.

It is therefore apparent that by the use of this adjustment the device can be adjusted to compensate for temperature changes for different grades of liquids that may be used in the control system, and is therefore not limited to any peculiarity of any one particular fluid.

A cover plate 39 is removably secured to the side of the casing housing the valve 107 to provide access to the valve to inspect or to adjust the bars 110.

While the thermostat control has been shown as applied to the automatically operated valve stem 30 it might be used on manually operated valve 29 instead.

While a particular form of heat sensitive device has been shown obviously other methods of controlling the valve 107 in response to temperature changes could be used and such modifications are held to be within the purview of this invention.

It will be obvious to those skilled in the art that various changes may be made in my device without departing from the spirit of the invention and therefore I do not limit myself to what is shown in the drawings and described in the specification, but only as indicated by the appended claims.

Having thus fully described my said invention, what I claim as new and desire to secure by Letters Patent, is:

1. In a feed control device, a fluid reservoir having a fluid conduit connected thereto, a check valve for permitting fluid to flow freely out of said reservoir into said conduit, a plurality of needle valves for controlling the flow of fluid from said conduit into said reservoir, manually operable means for adjusting one of said needle valves and heat responsive means for adjusting the other of said needle valves.

2. In a feed control device of the kind described, a reservoir having a fluid conduit connected thereto, a valve for permitting fluid to flow freely from said reservoir to said conduit, a plurality of ports for controlling the flow of fluid from said conduit to said reservoir, a manually operable needle valve in control of one of said ports, an automatically operable needle valve in control of the other of said ports and heat responsive means on said last-named valve for further controlling the port in response to changes in temperature of the fluid within said reservoir.

3. In a feed control device of the kind described, a reservoir having a fluid conduit connected thereto, a check valve for permitting fluid to flow freely from said reservoir to said conduit, a plurality of ports for controlling the flow of fluid from said conduit to said reservoir, a manually adjustable needle valve in control of one of said ports, an automatically operable needle valve in control of another of said ports, and heat responsive means for adjusting one of said needle valves.

4. In a machine of the kind described, a work support, a wheel support, fluid means to provide a relative transverse movement of said supports, means to effect movement at high speed, means to change said high speed to a grinding speed including a fluid controlled feed regulator and heat sensitive means adapted to maintain said grinding feed uniform regardless of variation in temperature of said fluid in said regulator.

5. In a grinding machine, a carriage, a fluid motor for moving said carriage, a hydraulic regulator for controlling the rate of movement of said carriage, a valve for controlling said hydraulic regulator and heat responsive means for adjusting said valve.

6. In a machine of the kind described a pair of carriages, fluid means to provide a relative feeding movement of one of said carriages toward the other, fluid mechanism to control said feeding movement, including a valve, and heat sensitive means controlling said valve, whereby to maintain a constant rate of flow of fluid therethru regardless of variation in temperature of the fluid.

HAROLD E. BALSIGER.